Sept. 4, 1951        E. D. SMYSER        2,566,680
FLOW INDICATOR
Filed May 17, 1947        2 Sheets-Sheet 2
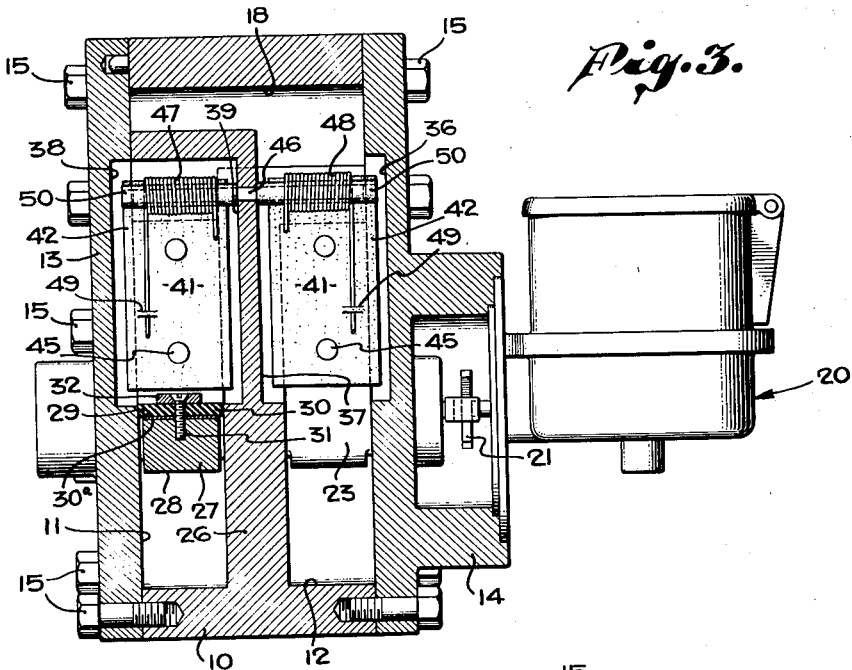
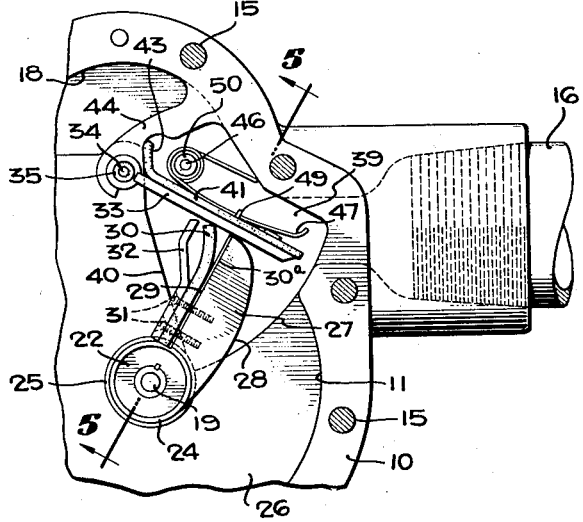
INVENTOR.
Elmer D. Smyser
BY Hazard & Miller
ATTORNEY Patented Sept. 4, 1951

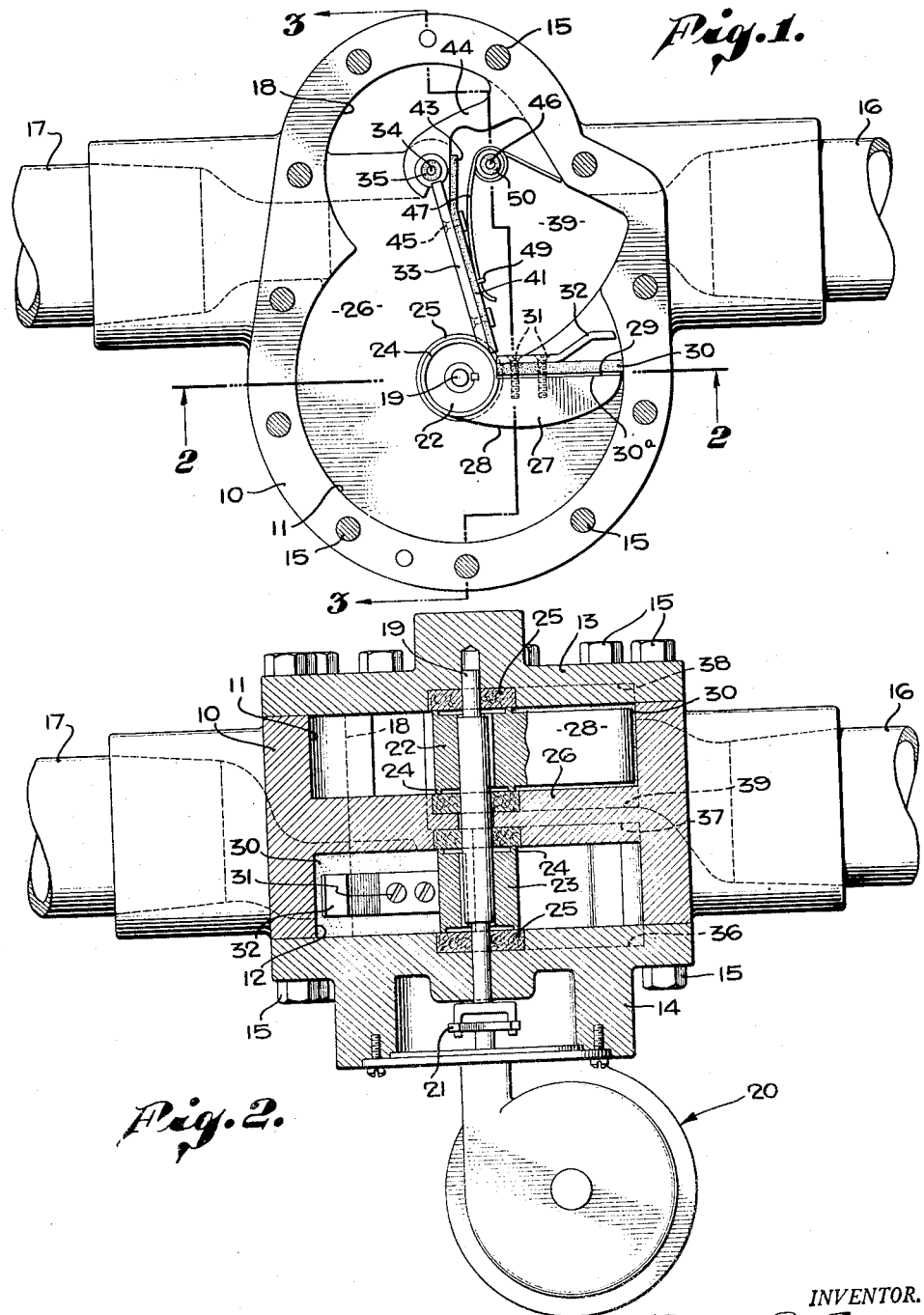

2,566,680

UNITED STATES PATENT OFFICE 2,566,680

FLOW INDICATOR

Elmer D. Smyser, Torrance, Calif.

Application May 17, 1947, Serial No. 748,749

5 Claims. (Cl. 121—78)

This invention relates to improvements in flow indicators and may be regarded as an improvement over the flow indicator disclosed in my copending application Serial No. 563,277, filed November 13, 1944, now Patent No. 2,528,617 granted November 7, 1950.

In my copending application there is disclosed a flow indicator consisting of a body providing two transversely aligned generally circular chambers. A shaft extends through both chambers on which radially extending impellers are mounted that are disposed in the respective chambers and which are angularly spaced substantially 180 degrees about the shaft. Gates are swingably mounted in the chambers and are engageable by the impellers in the course of the rotation of the impellers on the shaft. An inlet leads to the forward side of one of the chambers and fluid entering therethrough is directed by the gate so as to drive the impeller therein. A connecting duct leads from the first chamber to the second chamber discharging therein at a point forwardly of its gate so as to be directed thereby to drive the impeller therein before passing through the outlet arranged at the back of the second chamber. The shaft is connected to a recorder that will indicate the number of revolutions taken by the shaft and in this manner the quantity of fluid passing through the indicator is indicated volumetrically.

The construction disclosed in my copending application has been utilized advantageously for measuring the volume of oil passing through a pipe line such as, for example, the oil delivered from a well to a tank, or a collecting manifold. When used on lines where the volume passing through the pipe line is relatively small, the construction disclosed in said application has given very little trouble and has indicated the volume passing through the indicator with reasonable accuracy. However, when the device disclosed in said application was installed in lines wherein the flow was quite rapid or quite high in volume, it was found that during each rotation of the impeller in the first chamber its gate, on being swung toward the inlet would partially block the inlet, causing a back pressure in the inlet to be quickly built up. This, of course, was soon relieved as soon as the impeller passed beneath the gate allowing the gate to swing downwardly into engagement with the hub of the impeller. The building up of back pressure in the inlet was objectionable and, as it occurred periodically, vibrations in the line were apt to be set up.

An object of the present invention is to provide an improvement wherein there are by-pass passages or cavities formed in the walls of the chambers opposite the edges of the gate so that as the gate is swung by the impeller toward the inlet, these by-pass passages will permit of flow around the gate thus avoiding the building up of back pressure in the inlet and the objectionable vibration. While the by-pass passages or cavities are open in one chamber of the indicator they are closed in the companion chamber so that fluid cannot pass through the indicator without being measured. At the same time the swinging of the gates in the chambers toward their respective inlets does not tend to restrict or retard the flow momentarily as in the indicator disclosed in my copending application.

Another object of the invention is to provide an improved flow indicator wherein the by-pass passages are so arranged that their rear walls in effect provide seats for sections of sealing material on the gates when the gates are in their rear-most positions engaging the hubs on the impellers so that in this manner when the gates are seated on the hubs of the impellers and are directing flow against the impellers, leakage around the edges of the gates is effectively prevented.

Another object of the invention is to provide an improved impeller for flow indicators consisting of a hub applicable to the shaft of the indicator carrying a radially extending arm on the trailing side of which there is secured a section of sealing material and to provide a support on the trailing side of the arm that is spaced from the outer unsecured end of the sealing material so that as the impeller passes beneath its gate the free or unsecured outer end of the sealing material may flex between the arm and the support without becoming worn by its engagement with the gate thus prolonging the sealing life of the sealing section.

Another object of the invention is to provide an improved gate for flow indicators wherein a section of sealing material is secured to the forward side thereof in such a manner that it may be easily and quickly removed and replaced when it becomes worn.

Another object of the invention is to provide a flow indicator of this general character wherein a spring is used to urge the gate rearwardly and to so mount the spring that its life may be materially prolonged.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of a flow indicator embodying the present invention, one side wall or cover being shown as having been removed;

Fig. 2 is a horizontal section taken substantially upon the line 2—2 upon Fig. 1 in the direction indicated;

Fig. 3 is a composite section taken substantially upon the line 3—3 upon Fig. 1;

Fig. 4 is a partial view similar to Fig. 1 but illustrating the gate as having been engaged and lifted by its impeller; and Fig. 5 is a sectional view taken substantially upon the line 5—5 upon Fig. 4.

Referring to the accompanying drawings wherein similar reference characters designate similar parts throughout, the improved flow indicator consists of a body 10 providing on its sides two generally circular chambers 11 and 12, the outer sides of which are closed by end plates or caps 13 and 14 secured to the body such as by cap screws 15. This body is adapted to be connected in a pipe line in such a manner that the pipe 16 constitutes an inlet leading thereto and the pipe 17 serves as an outlet leading therefrom. The body 10 is suitably cored so that the inlet therein from the pipe 16 discharges into the top of the chamber 11 only. Egress from this chamber is through a duct or passage 18 to the top of the companion chamber 12 and fluid, after being directed by the gate therein against the impeller in that chamber, finally passes out through the outlet leading to the pipe 17.

A shaft 19 extends transversely through the body and its associated caps 13 and 14 and has one end connected to a recorder or register generally indicated at 20. The connection indicated at 21 is preferably such as to provide a limited amount of universal movement between the register and the shaft so that when the register is secured to the cap 14 it is not essential that its shaft be in perfect alignment with shaft 19. Impellers 22 and 23 are keyed upon the shaft 19 and each has a generally cylindrical hub on the ends of which there are circumferential edges 24 that bear and turn against fiber inserts 25 that are recessed in the end caps 13 and 14 and in the sides of the partition 26 that separates the chambers 11 and 12 except for the connecting duct 18. Each impeller has a radially extending arm 27 presenting on one side a rounded or cam face 28 and on the other side a flat, substantially radial surface 29. This arm is in width substantially equal to the normal width of its chamber and extends outwardly so as to pass closely adjacent the outer or circumferential wall of its chamber. A section 30 of sealing material that may be formed of soft flexible rubber, together with a very thin, flexible section of sheet metal 30a, are secured to the face 29 by means of screws 31 extending through a combined cleat and support indicated at 32. These screws are located adjacent the inner end of the section 30 only so that the outer end of the section is left free or loose. The section 30 is designed to wipe against the outer or circumferential wall of its cavity and to wipe against the lateral walls. However, during rotation of the impeller, as the impeller passes beneath the rear side of its gate 33 as illustrated in Fig. 4, the outer end of the sealing section 30 may swing away from the trailing face 29 of the impeller arm due to the spaced relation of the outer end of the support 32. Consequently, as viewed in Fig. 4, as the impeller passes beneath the gate 33, the gate is first supported on the end of the arm 27 and shortly thereafter on the end of the support 32 with the end of the sealing material merely flexing therebetween, reducing wear on its outer end as it passes beneath the gate. The thin section of sheet metal 30a has its marginal edges so positioned as to sweep closely adjacent the walls of the chamber. This section is quite thin and to some extent resilient, having a resiliency and thickness comparable with that of a flexible safety razor blade. This section provides a support for the sealing material 30 and will serve to keep the walls of the chamber relatively clean of deposited wax. On the other hand, if sand particles should deposit on these walls the flexibility of the section will permit its edges to flex and pass thereover. The gates 33 in the two chambers 11 and 12 are swingable about coincident axes on aligned pins 34 that extend into the two chambers 11 and 12 from opposite sides of the partition 26. Preferably there is a rubber bushing 35 interposed between each pin 34 and the knuckle of its respective gate. The gates are so arranged that after their respective impellers have passed beneath them the gates will swing downwardly and rearwardly into engagement with the hubs of their respective impellers, as illustrated in Fig. 1. Each chamber 11 and 12 has its side walls provided with by-pass passages or cavities opposite the side edges of its respective gate. Thus one by-pass passage 36 is formed on the inner face of the cap 14 and its companion by-pass passage is formed on the face of the partition 26 and is indicated at 37. In a similar manner a by-pass passage 38 is formed on the inner face of the cap 13 and its companion by-pass passage is formed on the wall of the partition 26, as indicated at 39. Each of these by-pass passages or cavities is generally quadrant-shaped to accommodate the swinging movement of its respective gate. However, as illustrated in Fig. 4, the rear wall of each cavity is substantially straight, as indicated at 40, and is approximately tangent to the hub of its respective impeller. Each gate is in width approximately equal to the width of the arm on its impeller but carries on its forward side a sealing section 41 formed of soft stretchable rubber. These sealing sections are somewhat wider than the gates, as illustrated in Fig. 3, and project laterally beyond their side edges into the by-pass passages or cavities so as to provide lateral lips 42 designed to engage and seal on the rear walls 40 when the gates are in their rearward-most positions, as shown in Fig. 1. Consequently, in these positions the flexible lips 42 will be forced by the incoming fluid pressure into engagement with the walls 40, effectively preventing leakage around the gates when the gates are in their rearward-most or closed positions engaging the hubs of their respective impellers. The sealing sections 41 are slightly longer than their respective gates providing portions 43 which overlie portions of the web 44 on each partition to prevent leakage to the knuckle of the gate. These sections of sealing material are secured to the forward faces of their respective gates by means of small headed rivets 45 and the sections of sealing material have buttonhole slits formed therein which are stretched over the heads of the rivets. This serves adequately to retain the sealing material on the gate but permits the sealing material to be readily removed and replaced in that it is merely necessary to stretch the buttonhole slits in removing the sealing material or substituting new sealing material therefor.

Forwardly of the gates 33 a transverse pin 46 extends through the partition 26 and provides anchoring studs at its ends for anchoring springs 47 and 48. These springs have one end bearing against a wall of the chamber in which they are disposed and the other end extended beneath a short strap 49 formed in the body of the sealing section 41 by means of parallel slits. Each spring serves to urge its respective gate rearwardly. I find it advantageous to apply rubber bushings 50 around these studs so that a resilient layer is interposed between the spring and the stud by which it is anchored. This resilient bushing serves to prolong the life of each spring in that I have noticed that if the spring is anchored directly around the stud the spring is apt to break in a relatively short time.

The operation of the above described construction is as follows: Fluid, such as oil, entering the indicator from the inlet 16 encounters the forward side of the gate 33 which is covered with the sealing material 41 and is directed downwardly thereby toward the impeller in the chamber 11 thus driving the impeller and imparting rotary movement to the shaft 19. As the impeller in the chamber 11 approaches completion of one revolution, the fluid thus admitted to this chamber may then pass therefrom through the duct 18 to the chamber 12 on the forward side of its gate to be directed thereby against its impeller and to cause its impeller to likewise impart rotary motion to the shaft 19 before the fluid escapes to the outlet 17. As the two impellers are located on the shaft 19 one hundred and eighty degrees apart, one impeller will be driven by the fluid passing through the indicator while the other impeller is passing beneath its gate. When the impeller encounters its gate the cam surface 28 engages the gate and lifts the gate from the position shown in Fig. 1 to the position shown in Fig. 4, and as the impeller passes through the position illustrated in Fig. 4, the outer free end of the sealing section 30 may be flexed as illustrated in Fig. 4, thus reducing wear on its outer end. The gate is first supported by the arm 27 and quickly has its support shifted to the outer end of the support 32.

In the position shown in Fig. 4, it will be noted that the gate has swung forwardly toward the inlet so as to be disposed in the paths of the oil entering through the inlet. In the present form of construction this does not involve any severe rise in pressure in the inlet in that the forward swinging movement of the gate opens the by-pass passages or cavities permitting the oil to flow around the sides of the gate as well as across the small space still available at its end. As the impeller continues its rotary movement from the position shown in Fig. 4 to the position shown in Fig. 1, the gate is released and allowed to return to the position shown in Fig. 1 wherein it re-engages the cylindrical hub on the impeller. In this position the lips 42 seal against the rear walls 40 preventing leakage through the by-pass cavities around the gate and causing all flow of incoming oil to be directed downwardly against the impeller. It will be appreciated that in the chamber 12 a similar cycle of operations is simultaneously taking place but timed 180 degrees from the timing of the operations in the chamber 11. When the by-pass passages or cavities are open in chamber 11, the corresponding by-pass passages or cavities in chamber 12 are closed and, conversely, when the by-pass cavities in chamber 12 are closed, those in chamber 11 are open. Inasmuch as one set of by-pass cavities is always closed, it is impossible for flow to take place through the indicator directly from the inlet to the outlet without causing one of the impellers to impart rotary motion to the shaft 19. The rotations of the shaft 19 are recorded on the recorder 20 and are indicative of the volume of oil that has passed through the indicator.

It will be appreciated that the improved indicator is highly advantageous in that by means of the by-passing, pressures in the inlet 16 are not suddenly built up due to the swinging of the gate 33 into the path of the inlet. Furthermore, the construction is of relatively simple and durable design wherein leakage around the impeller is effectively prevented by engagement of the edges of the sealing sections 30 with the walls of their respective chambers. If these sealing sections become worn and require replacement, this can be easily accomplished by removing the caps 13 and 14, the supports 32 and the screws 31 and new sealing sections substituted therefor. Similarly, if the sealing material 41 should require replacement, this can be easily accomplished by removing the end caps and stretching the buttonhole slits in the sealing material 41 over the heads of the rivets in removing and replacing this material. The arrangement is such that although by-passing can readily take place around the gate when the gate is in lifted position, an effective seal is provided by the lips 42 preventing leakage around the gate when the gate is in its rearmost position.

Various changes may be made in the details of construction without departing from the spirit and scope of the invention as defined by the appended claims.

I claim:

1. A flow indicator comprising a body having a first and second chamber in side-by-side relationship, an inlet leading to the forward side of the first chamber, an outlet leading from the rear side of the second chamber, a shaft extending through both chambers, impellers mounted upon said shaft and disposed in said chambers respectively, said impellers being angularly disposed with relation to each other on the shaft, a gate in each chamber, the gate in the first chamber being engageable by its impeller and swingable toward the inlet, the gate in the second chamber being engageable by its impeller and swingable in the same direction, a duct connecting the chambers from behind the gate in the first chamber to forwardly of the gate in the second chamber, there being by-pass cavities formed in the side walls of the chambers arranged to be traversed by the edges of the gates as the gates are swung by their respective impellers toward the inlet, the rear walls of the cavities providing seats for the sides of the gates when the gates are in their rearmost positions.

2. In a flow indicator, a chamber, an impeller rotatable therein, a gate swingable in the chamber for directing flow against the impeller, there being by-pass cavities in the walls of the chamber adapted to be traversed by the side edges of the gate whereby when the gate is moved forwardly by the impeller during its rotation, by-passing may take place around the side edges of the gate, and a section of sealing material secured to the gate presenting flexible lips at the sides thereof engageable with rear walls of the by-pass cavities to prevent leakage through the by-pass cavities when the gate is in its rearmost position.

3. In a flow indicator, a body providing a chamber, an impeller mounted for rotation in the chamber, a gate swingably mounted for movement in the body for directing flow against the impeller, there being bypass cavities in the body located along the path of travel of the gate and adapted to be traversed by the side edges of the gate whereby when the gate is moved forwardly by the impeller during rotation of the impeller, bypassing may take place around the side edges of the gate, and sealing means carried by the gate for engaging the rear walls of the bypass cavities to prevent leakage through the bypass cavities when the gate is in its rearmost position.

4. In a flow indicator, a body providing a chamber, an impeller mounted for rotation in the chamber, a gate swingably mounted for movement in the body for directing flow against the impeller, the side edges of the gate terminating short of the side walls of the chamber whereby bypassing may take place around the side edges of the gate, there being rear walls extending inwardly from the side walls of the chamber and located at the rearmost position of the gate, and sealing means carried by the gate for engaging said rear walls when the gate is in its rearmost position to prevent leakage around the gate.

5. In a flow indicator, a chamber, an impeller rotatable therein, a gate swingable in the chamber for directing flow against the impeller, there being bypass cavities in the walls of the chamber adapted to be traversed by the side edges of the gate whereby when the gate is moved forwardly by the impeller during its rotation, bypassing may take place around the side edges of the gate, and a section of sealing material secured to the side of the gate opposite the side which the impeller engages, the section of sealing material extending beyond the side edges of the gate but terminating short of the side walls of the cavity and engaging with the rear walls of the cavity when the gate is in its rearmost position to prevent leakage around the gate.

ELMER D. SMYSER.

REFERENCES CITED

The following references are of record in the file of this patent:

UNITED STATES PATENTS

| Number | Name | Date |
|---|---|---|
| 77,780 | Thunell et al. | May 12, 1868 |
| 601,854 | Meyer | Apr. 5, 1898 |
| 902,054 | Coffield | Oct. 27, 1908 |
| 926,689 | Coffield | June 29, 1909 |
| 1,306,238 | Ulland | June 10, 1919 |
| 1,421,690 | Howard | July 4, 1922 |
| 1,983,033 | Hutchinson | Dec. 4, 1934 |